United States Patent [19]

Marko

[11] 4,408,030

[45] Oct. 4, 1983

[54] WASTE CHLOROSILANE TREATMENT

[75] Inventor: Ollie W. Marko, Carrollton, Ky.

[73] Assignee: Dow Corning Corporation, Midland, Mich.

[21] Appl. No.: 360,271

[22] Filed: Mar. 22, 1982

[51] Int. Cl.³ ............................................. C08G 77/00
[52] U.S. Cl. ........................................ 528/10; 528/12; 528/14; 556/451; 556/453; 556/455; 556/456; 556/452; 556/457
[58] Field of Search ............... 556/451, 453, 455, 456, 556/457, 452; 528/10, 14, 12

[56] References Cited

U.S. PATENT DOCUMENTS 3,489,782  1/1970  Pruvost et al. ....................... 528/10
4,056,492 11/1977  Merrill ................................. 528/10
4,221,691  9/1980  Danielson et al. ................... 528/12

Primary Examiner—Melvyn I. Marquis
Attorney, Agent, or Firm—Richard A. Kaba

[57] ABSTRACT

A process is described by which numerous waste or by-product chlorosilane streams can be treated to obtain a granular gel that is easily handleable in further processing steps, shipment, or disposal operations. By hydrolyzing a combined stream with an average SiCl functionality greater than or equal to 2.8 in an aqueous medium at elevated temperature a granular gel is obtained in all cases. The combined stream can be formed by blending several different streams to obtain the desired average SiCl functionality. If the aqueous medium is concentrated hydrogen chloride, the hydrogen chloride generated in the hydrolysis step can be recovered.

8 Claims, No Drawings

WASTE CHLOROSILANE TREATMENT

BACKGROUND OF THE INVENTION

This invention relates to a process for treating a plurality of streams containing chlorosilicon compounds. More specifically this invention relates to a process for treating a plurality of streams containing chlorosilicon compounds to obtain a solid siloxane material or gel that is easily handleable in further processing steps, shipment, or disposal operations.

A wide variety of commercial silicone polymers are produced by the hydrolysis of a few basic chlorosilanes. Also, pure silicon metal useful in the fabrication of semiconductor devices is made from the reduction of certain chlorosilanes. These important chlorosilane monomers are produced by processes that also yield minor amounts of by-products. For example, methylchlorosilanes are obtained from the reaction of methyl chloride with silicon by what is commonly called the "direct process" method; and chlorosilanes are produced from the reaction of silicon metal with hydrogen chloride. Because of the commercial importance of these and other processes for producing chlorosilanes, large amounts of by-product streams are generated. Additionally, other minor waste streams are produced in a commercial silicone plant. These minor waste streams include, for example, distillation residues, contaminated wash solvents, reaction residues from production of intermediates, and off-specification material.

The eventual disposition of these by-product and waste streams has become a significant problem as the production volume of silicone polymers has increased. Both the increased volume of the waste streams and the complexity and variability of the individual streams contribute to the waste disposal problems of a commercial silicone operation.

An approach to the problems of waste disposal was disclosed in U.S. Pat. No. 4,221,691, issued Sept. 9, 1980 to Danielson and Ingebrigtson, which is hereby incorporated in its entirety by reference. Danielson et al. taught that the addition of a relatively small amount of a hydrocarbon oil to a polyfunctional chlorosilicon composition prior to hydrolysis significantly improves the handling characteristics of the siloxane gel that is obtained. The term "polyfunctional chlorosilicon composition" was defined as "compositions containing a major proportion of chlorosilicon compounds with at least 3 chlorine radicals bonded to silicon per molecule." Therefore, the method of Danielson et al. could not be used to successfully hydrolyze many of the by-product or waste streams of a commercial silicone plant to obtain a handleable gel since many of these streams may not contain sufficient polyfunctional chlorosilicon compounds. Furthermore, the use of the hydrocarbon oil of Danielson et al. represents an additional expense in the waste treatment process. Also, the presence of the added hydrocarbon oil in the siloxane gel may present additional obstacles in the eventual disposition of the produced siloxane gel especially in the present era of heightened environmental concerns.

It is an object of this present invention to provide a process for treating a plurality of by-product and/or waste streams containing chlorosilicon compounds to produce a siloxane gel that is easily handleable in further processing steps, shipment or disposal. Another object of this invention is to provide a process by which the diverse by-product and/or waste streams of a commercial silicone plant can be economically hydrolyzed to greatly reduce the chlorine content prior to disposal. Still another object of the present invention is to provide a method of treating by-product and/or waste chlorosilicon streams whereby hydrogen chloride may be recovered. Still other objects of this invention will be known to those skilled in the art upon consideration of this specification.

SUMMARY OF THE INVENTION

This invention relates to a process for treating a plurality of streams containing chlorosilicon compounds which process comprises the steps of
(A) determining the average SiCl functionality of the streams,
(B) blending at least two streams so that the average SiCl functionality of the blended stream is greater than or equal to 2.8,
(C) hydrolyzing the blended stream by mixing the blended stream with an aqueous medium at a temperature between 50° C. and the boiling point of the aqueous medium, and
(D) removing the aqueous medium to obtain a granular gel.

This invention also relates to a process for treating a stream containing chlorosilicon compounds and having an average SiCl functionality of greater than or equal to 2.8 which process comprises the steps of (A) hydrolyzing the stream by mixing the stream with an aqueous medium at a temperature between 50° C. and the boiling point of the aqueous medium and (B) removing the aqueous medium to obtain a granular gel.

DESCRIPTION OF THE INVENTION

This invention is based on the discovery that a handleable, non-sticky siloxane gel can be obtained from a wide variety of chlorosilicon containing by-product and/or waste streams by the high temperature hydrolysis of such streams if the average SiCl functionality of the mixture to be hydrolyzed is greater than or equal to 2.8. Mixtures with an average SiCl functionality of between about 2.5 and 2.8, when employed in the process of this invention, can yield a siloxane product that can be either a handleable gel as desired or an undesirable sticky paste. In this "transitional" region of SiCl functionality, the nature of the resulting siloxane material appears to be related to the actual chlorosilicon compounds present in the mixture. It is recommended that if, during the practice of this invention on a commercial scale it is desirable to employ a blended stream or mixture with an average SiCl functionality between 2.5 and 2.8, that the hydrolysis be first carried out on a laboratory scale to determine the nature of the resulting siloxane. If a handleable gel results then the commercial scale operation using such a stream should prove satisfactory. If, however, a sticky gel results then it is recommended that another stream be added to raise the average SiCl functionality to a level, preferably greater than or equal to 2.8, that results in a handleable siloxane gel upon hydrolysis. If a material with an average SiCl functionality less than 2.5 is hydrolyzed in a manner similar to that described in this present invention, a handleable siloxane gel is not obtained.

The average SiCl functionality of the mixture to be hydrolyzed is kept within the prescribed limit by determining the average SiCl functionality of the appropriate by-product and/or waste stream and blending streams to arrive at the desired average SiCl functionality. For the present invention the term "SiCl functionality" of a given chlorosilicon compound is defined as the number of Si—Cl bonds in the chlorosilicon compound. For example, the SiCl functionality, f, of several chlorosilicon compounds is given as follows: $R_3SiCl$, $f=1$; $R_2SiCl_2$, $f=2$; $RSiCl_3$, $f=3$; $SiCl_4$, $f=4$; $RCl_2SiSiCl_2R$, $f=4$; $RCl_2SiSiClR_2$, $f=3$; $RCl_2SiOSiCl_3$, $f=5$; $Cl_3SiSiCl_3$, $f=6$; etc., where R is a non-chlorine radical. The average SiCl functionality of a stream or mixture is the weighted average of SiCl functionality of all Si—Cl containing compounds in the stream or mixture. The non Si—Cl containing compounds and any unidentified compounds in the mixture are not considered in the determination of the average SiCl functionality. In other words, the relative amounts of all Si—Cl containing compounds are normalized to 100% total in determining the average SiCl functionality of the stream. In a similar fashion, the average SiCl functionality of a blended stream is the weighted average of the SiCl functionality of all Si—Cl containing compounds in the blended stream where the relative amounts of the individual SiCl compounds are normalized to 100%.

The most convenient method known to the applicant for the routine determination of the average SiCl functionality of a by-product and/or waste stream is the technique of gas-liquid chromatography (glc) once the various components of a given stream have been identified. The combined techniques of glc and mass spectrometry are very useful in making the initial identification of the SiCl compounds in a complex stream. Other analytical techniques may be used to determine the average SiCl functionality of chlorosilicon streams. The techniques of glc and mass spectrometry, as well as other appropriate techniques, as applied to chlorosilicon compounds are discussed in detail in, for example, *Analysis of Silicones*, A. L. Smith (ed), John Wiley and Son, New York, N.Y. (1974) to which the interested reader is referred. Some by-product or waste streams in a commercial silicone plant will not normally vary significantly with time in regards to either the Si—Cl compounds present or their relative amounts. One example of such a stream might be the by-product stream from the production of methylchlorosilane by the reaction of silicon metal and methyl chloride. In such a case, the average SiCl functionality determination may be from a knowledge of past analysis. Process upsets or changes in raw materials may require that the average SiCl functionality be determined by analyzing the actual stream.

One method of carrying out the present invention is to first determine the average SiCl functionality of various waste streams and then blend to obtain the desired average SiCl functionality of the blended stream. Hydrolysis and related steps would then follow. In some cases, however, the order of various steps can be changed. For example, it may be more convenient to collect small volume streams in a single holding tank and determine the average SiCl functionality of the several blended streams prior to hydrolysis. If the average SiCl functionality of the combined stream was within the desired limits no further additions or blending would be required.

The chlorosilicon compounds that may be present within the waste or by-product streams include organic substituted and non-organic substituted silanes, disilanes, disiloxanes, silane oligomers, siloxane oligomers, silphenylenes and silalkylenes in which at least one Si—Cl bond is present. In addition to the above named chlorosilicon compounds, the by-product or waste stream may contain solvents, suspended Si metal fine, and silicon containing compounds without any Si—Cl bonds. For example toluene, benzene, ethylbenzene, ethyltoluene, 2-methylhexane, and 3-methylhexane have been identified as by-products from the direct process production of methylchlorosilanes. It is apparent that not all streams containing a chlorosilicon compound necessarily should be treated by the process of this invention. For example, in a stream containing major amounts of an organic solvent and a minor amount of a chlorosilane, it may be more economically attractive to reclaim the organic solvent before treating the chlorosilane by the method of this invention. In another example, a waste stream containing a toxic chemical such as polychlorinated biphenyl, for example, would, if blended with other waste streams, only complicate the eventual disposition of large quantities of siloxane gel.

In a preferred embodiment of the invention the blended stream contains by-products from the production of commercial chlorosilicon monomers. Suitable by-products include the high boiling residues from the direct process production of methylchlorosilanes, the Grignard synthesis of phenylmethylchlorosilanes, the synthesis of phenylchlorosilanes via the reaction of benzene and trichlorosilane, and the synthesis of chlorosilanes via the reaction of silicon metal and hydrogen chloride. These by-products are complex mixtures that have little value because of the difficulty of separating the many components. The major components of the by-products are chlorosilanes, chlorodisilanes, chlorodisiloxanes, chlorosilphenylenes and chlorosilalkylenes.

Chlorosilicon compound stream or mixtures suitable for treatment by this invention also include, for example, distillation residues, distillation waste cuts, filtration residues, by-product or waste material from the production of commercial intermediates and polymers, off-specification material, etc.

The blending of the desired streams to obtain a blended stream of the desired average SiCl functionality may be carried out by any appropriate means. The blending may be effected either before or at the same time as the introduction of the chlorosilicon compound mixture into the aqueous medium.

The blended chlorosilicon stream with the appropriate average SiCl functionality is added to the aqueous medium which is agitated to facilitate the hydrolysis. Both the rate addition of the chlorosilicon stream to the aqueous medium and the rate of agitation of the resulting mixture can be used to control the particle size of the resulting granular gel. The aqueous medium may consist of only water initially, in which case the hydrogen chloride formed by the hydrolysis dissolves in the water. When the water becomes saturated with the hydrogen chloride, gaseous hydrogen chloride will be evolved. The aqueous medium may contain hydrogen chloride or an inorganic chloride salt initially so that gaseous hydrogen chloride is evolved even at the start of the hydrolysis. Inorganic salts such as sodium chloride or calcium chloride may be employed. The term "aqueous" means that the medium contains essentially water as the component reacting with the chlorosilicon compounds and excludes such organic components as alcohols which are also reactive with chlorosilicon compounds. In a preferred embodiment of the invention, hydrogen chloride gas is recovered from the hydrolysis and the aqueous medium consists of concentrated hydrogen chloride solution. The amount of aqueous medium employed can be varied widely so long as sufficient water is employed to completely hydrolyze the chlorosilicon composition.

The hydrolysis is to be carried out at a temperature between 50° C. and the boiling point of the aqueous medium. It is preferred, however, that the hydrolysis be carried out at a temperature between 60° and 90° C. If the hydrolysis is carried out at temperature significantly below 50° C. a sticky siloxane gel may result because, apparently, of incomplete hydrolysis at low temperature.

The hydrolysis is endothermic when the aqueous medium is concentrated hydrogen chloride and heating may be employed to maintain the temperature. When the aqueous medium is only water the hydrolysis is exothermic and cooling may be employed to control the reaction.

The hydrolysis may be carried out at atmospheric, sub-atmospheric, or super-atmospheric pressure. Because of economic considerations, it is preferred that the hydrolysis take place at or near atmospheric pressure.

As the hydrolysis progresses, granular siloxane gel particles separate from the aqueous medium. When the separation of gel particles ceases, the gel may be removed from the aqueous medium by any convenient manner such as filtration or centriguation. The gels thus obtained by the process of this invention are non-sticky and easily handleable in further processing steps, shipment or disposal operations. In a preferred embodiment of this invention the gel is washed with water one or more times to further reduce the chlorine content of the gel.

The process of this invention may be carried out in a batch, semi-continuous, or continuous mode.

The following examples are presented for illustrative purposes only and should not be construed as limiting the invention.

EXAMPLE 1

Samples were taken from a waste chlorosilicon storage tank periodically over a six month period. The storage tank contained wastes generated in a commercial silicone manufacturing plant. These wastes collected were from such commercial processes as the Grignard synthesis of phenylmethylchlorosilane, the synthesis of phenylchlorosilanes, distillation residues, and other waste-generating processes. These samples did not contain waste from either the production of methylchlorosilanes from the direct process or from the synthesis of chlorosilanes via the reaction of silicon and hydrogen chloride. The waste samples were analyzed using glc and glc-mass spectrometry techniques. A cryogenically cooled Hewlett-Packard Model 5710A chromatograph in conjunction with a Hewlett-Packard Model 3354 Lab Automation System was employed for the analysis. The glc column was ⅛ inch diameter by 12 foot stainless steel using a column packing of 15% SP2250 (a phenylmethylsiloxane/dimethylsiloxane copolymer) on Chromsorb P support (80-100 mesh). The column packing was obtained from Supelco Inc. of Bellefonte, Pa. The column temperature was programed from 35° C. to 270° C. at a rate of 8° C./min. for the analysis. The analysis of the samples from the waste tank in glc area percent, are shown in the Table below. The "other" components listed in the Table includes both identified component containing no Si—Cl bonds and unidentified components. Most of the components included in the "other" catagory were organic solvents such as pentane, heptane, benzene and substituted aromatics.

TABLE

| Components | SAMPLE | | | | | |
|---|---|---|---|---|---|---|
| | A | B | C | D | E | F |
| SiCl$_4$ | 1.9 | 6.2 | 5.2 | 21.1 | 13.0 | 24.1 |
| MeSiCl$_3$ | 2.3 | 7.1 | 7.3 | 5.1 | 4.4 | 6.1 |
| Et$_2$MeSiCl | 0.7 | 0.5 | 0.7 | 0.6 | 1.1 | 0.5 |
| EtSiCl$_3$ | 0 | 0.2 | 0.4 | 0 | 0.2 | 0.1 |
| PrSiCl$_3$ | 0.5 | 1.5 | 1.7 | 1.1 | 0.6 | 3.4 |
| BuSiCl$_3$ | 0.4 | 1.3 | 1.4 | 0.5 | 0.2 | 1.2 |
| PhMeHSiCl | 0 | 0.7 | 0.6 | 0 | 1.6 | 1.1 |
| PhSiCl$_3$ | 10.8 | 6.8 | 6.3 | 8.4 | 1.5 | 3.4 |
| PhMeSiCl$_2$ | 15.1 | 11.4 | 10.9 | 11.8 | 3.6 | 4.8 |
| PhMeEtSiCl | 17.1 | 11.7 | 10.0 | 11.9 | 2.6 | 4.7 |
| "Other" | 51.2 | 52.6 | 55.5 | 39.5 | 71.2 | 50.6 |

In the table "Me" represents a methyl radical, "Et" a ethyl radical, "Pr" a n-propyl radical, "Bu" a n-butyl radical, and "Ph" a phenyl radical.

The average SiCl functionality, $f_{av}$, of each sample was calculated by applying the following summation $$f_{av} = \sum_{i=1}^{N} \frac{f_i(P_i)}{(100 - P_o)}$$

where the summation is over all Si—Cl containing components identified in the mixture, there being N such components, and where $f_i$ is the SiCl functionality of component i, $P_i$ is the percentage of component i in the total mixture, and $P_o$ is the percentage of "others" in the total mixture. It was not possible with the glc column and conditions used to resolve the glc peak due to ethyltrichlorosilane and methylethyldichlorosilane. For calculation purposes it was assumed that the SiCl functionality was 2.5 or, in other words, that a 50/50 mix of the two peaks was responsible for the glc response. Using this procedure the following average SiCl functionalities for the samples in the Table were determined.

| | A | B | C | D | E | F |
|---|---|---|---|---|---|---|
| $f_{av}$ | 2.0 | 2.3 | 2.4 | 2.7 | 3.0 | 3.1 |

Each of the waste samples A through F were individually hydrolyzed. About 50 ml of each sample was individually added with rapid stirring, over a 15 minute period, to about 200 ml of concentrated (36%) hydrogen chloride in water maintained at 80° C. Evolved hydrogen chloride was normally trapped by bubbling into water. Hydrolysis was allowed to continue for about 15 to 30 minutes after the final waste chlorosilicon addition. After removal of the aqueous medium, the resulting siloxane was examined to determine its physical state and handleability. The following results were obtained:

| Sample | Observation |
|---|---|
| A | liquid |
| B | sticky paste |
| C | fluid-paste |
| D | thick paste |
| E | granular, non-sticky gel |
| F | granular, non-sticky gel |

Samples A,B,C, and D are included here for comparative purposes only. Sample A,B, and C do not yield a handleable gel because their average SiCl functionality is below the required limit of 2.8. Sample D is an example of a blended stream having an average SiCl functionality in the "transition" range. Samples E and F both have average SiCl functionalities greater than 2.8 and yield handleable gels.

EXAMPLE 2

A combined waste stream from the direct process production of methylchlorosilanes from the reaction of silicon metal and methylchloride was treated in a manner similar to that described in Example 1. Glc and mass spectrometry analysis of the liquid portion gave the following general composition: f=2 compounds, 16%; f=3, 35%; f=4, 28%; and "other", 21%, where "others" is mainly unidentified silicon containing compounds. This sample also contained about 20% solids in the form of silicon metal. Therefore the total sample contained about 63% of various Si—Cl containing components and about 37% of other components including solids. The average SiCl functionality of this sample is 3.2. Hydrolysis and removal of the aqueous medium by filtration yielded a granular, handleable siloxane gel. The gel was somewhat gritty due to the suspended silicon metal.

EXAMPLE 3

A combined waste stream from the production of chlorosilanes from the reaction of silicon metal and hydrogen chloride was treated in a manner similar to that described in Example 1. The general composition of the liquid portion of this sample was a follows: f=2 compounds, 2%; f=3, 4%; f=4, 78%; f=6, 11%; and other, 5%. The sample also contained about 25% solids in the form of AlCl$_3$ and silicon metal. Therefore, the total sample contained about 71% of various Si—Cl containing components and about 29% of other components including solids. A value of 4.1 was determined as the average SiCl functionality. A granular, handleable siloxane gel, somewhat gritty, was obtained upon hydrolysis and removal of the aqueous medium.

Examples 4 through 8 demonstrate the effect of blending various waste or by-product samples on the siloxane hydrolysis product. The average SiCl functionality calculation and the hydrolysis reaction were carried in the same manner as described in Example 1.

EXAMPLE 4

A blended waste stream prepared from 75 parts of Sample A of Example 1 and 25 parts of the sample of Example 2, included for comparative purposes, had a calculated average SiCl functionality of 2.4 and yielded a sticky paste upon hydrolysis and removal of the aqueous medium. A blended waste stream prepared from 50 parts of the same Sample A and 50 parts of the same sample of Example 2 had a calculated average SiCl functionality of 2.7 and yielded a handleable, granular gel.

EXAMPLE 5

A blended waste stream prepared from 75 parts of Sample A of Example 1 and 25 parts of the sample of Example 3, included for comparative purposes, had a calculated average SiCl functionality of 2.7 and yielded a sticky gel upon hydrolysis. A blended waste stream prepared from 50 parts of the same sample A and 50 parts of the same sample of Example 3 had a calculated average SiCl functionality of 3.2 and yielded a handleable, granular siloxane gel.

EXAMPLE 6

A blended waste stream prepared from 75 parts of Sample B of Example 1 and 25 parts of the sample of Example 2 had a calculated average SiCl functionality of 2.6. A second blend waste stream prepared from 50 parts of Sample B of Example 1 and 50 parts of the sample of Example 2 had a calculated average SiCl functionality of 2.8. Both blended waste streams upon hydrolysis and removal of the aqueous medium by filtration, gave handleable, granular gels.

EXAMPLE 7

A blended waste stream prepared from 75 parts of Sample B of Example 1 and 25 parts of the sample of Example 3 had a calculated average SiCl functionality of 2.9. A second blended waste stream prepared from 50 parts of Sample B of Example 1 and 50 parts of the sample of Example 3 had a calculated SiCl functionality of 3.4. Both blended streams, upon hydrolysis and removal of the aqueous medium, gave handleable, granular gels.

EXAMPLE 8

A blended waste stream prepared from 75 parts of Sample D of Example 1 and 25 parts of the sample of Example 2 had a calculated average SiCl functionality of 2.8 and yielded a handleable, granular siloxane gel upon hydrolysis and removal of the aqueous medium.

EXAMPLE 9

This example demonstrates that the chlorine content of the siloxane gel obtained in this invention can be further reduced by water washing. The granular gel obtained in Example 2 had a chloride ion content of about 15% as determined by silver nitrate titiation. The gel was washed three times with an equal weight of water. The water washing reduced the chloride ion content to about 0.6%.

That which is claimed is:

1. A waste treatment process for treating a plurality of streams containing chlorosilicon compounds which waste treatment process comprises the steps of
   (A) determining the average SiCl functionality of the streams,
   (B) blending at least two streams so that the average SiCl functionality of the blended stream is greater than or equal to 2.8,
   (C) hydrolyzing the blended stream by mixing the blended stream with an aqueous medium at a temperature between 50° C. and the boiling point of the aqueous medium, and
   (D) removing the aqueous medium
to obtain a granular gel from said waste treatment process where said granular gel is easily handleable in further processing steps, shipment or disposal operations.

2. A process as defined in claim 1 wherein the aqueous medium is selected from the group consisting of water, an aqueous calcium chloride solution, and a concentrated hydrogen chloride solution.

3. A process as defined in claim 2 wherein the temperature of the hydrolysis step (C) is between 60° and 90° C.

4. A process as defined in claim 3 wherein the aqueous medium is a concentrated hydrogen chloride solution and the hydrogen chloride gas evolved in the hydrolysis step (C) is recovered.

5. A process as defined in claims 3 or 4 wherein the granular gel is washed with water whereby the chlorine content of the granular gel is further reduced.

6. A process as defined in claims 2,3, or 4 wherein the blended stream contains organosilicon compounds which are by-products from the production of commercial chlorosilane monomers.

7. A process as defined in claim 6 wherein the by-products are from the direct process production of methylchlorosilanes.

8. A process as defined in claim 6 wherein the by-products are from the production of trichlorosilane by the reaction of silicon metal and hydrogen chloride.

* * * * *

UNITED STATES PATENT AND TRADEMARK OFFICE
CERTIFICATE OF CORRECTION

PATENT NO. : 4,408,030
DATED : October 4, 1983
INVENTOR(S) : Ollie W. Marko

It is certified that error appears in the above—identified patent and that said Letters Patent is hereby corrected as shown below:

In Column 6, this replaces the TABLE

| Components | Sample | | | | | |
|---|---|---|---|---|---|---|
| | A | B | C | D | E | F |
| $SiCl_4$ | 1.9 | 6.2 | 5.2 | 21.1 | 13.0 | 24.1 |
| $MeSiCl_3$ | 2.3 | 7.1 | 7.3 | 5.1 | 4.4 | 6.1 |
| $Et_2MeSiCl$ | 0.7 | 0.5 | 0.7 | 0.6 | 1.1 | 0.5 |
| $EtSiCl_3$ $EtMeSiCl_2$ | 0 | 0.2 | 0.4 | 0 | 0.2 | 0.1 |
| $PrSiCl_3$ | 0.5 | 1.5 | 1.7 | 1.1 | 0.6 | 3.4 |
| $BuSiCl_3$ | 0.4 | 1.3 | 1.4 | 0.5 | 0.2 | 1.2 |
| $PhMeHSiCl$ | 0 | 0.7 | 0.6 | 0 | 1.6 | 1.1 |
| $PhSiCl_3$ | 10.8 | 6.8 | 6.3 | 8.4 | 1.5 | 3.4 |
| $PhMeSiCl_2$ | 15.1 | 11.4 | 10.9 | 11.8 | 3.6 | 4.8 |
| $PhMeEtSiCl$ | 17.1 | 11.7 | 10.0 | 11.9 | 2.6 | 4.7 |
| "Other" | 51.2 | 52.6 | 55.5 | 39.5 | 71.2 | 50.6 |

Signed and Sealed this

Sixth Day of December 1983

[SEAL]

Attest:

GERALD J. MOSSINGHOFF

Attesting Officer   Commissioner of Patents and Trademarks